Dec. 11, 1923.

R. COATES

HANDLE LATCH FOR VACUUM CLEANERS

Filed Nov. 14, 1922

1,477,243

WITNESS
G. V. Rasmussen

INVENTOR
ROBERT COATES
BY
Briesen Schrenk
ATTORNEYS

Patented Dec. 11, 1923.

1,477,243

UNITED STATES PATENT OFFICE.

ROBERT COATES, OF RAHWAY, NEW JERSEY, ASSIGNOR TO THE REGINA CORPORATION, OF RAHWAY, NEW JERSEY, A CORPORATION OF NEW JERSEY.

HANDLE LATCH FOR VACUUM CLEANERS.

Application filed November 14, 1922. Serial No. 600,839.

*To all whom it may concern:*

Be it known that I, ROBERT COATES, a British subject, and resident of Rahway, county of Union, State of New Jersey, have invented a certain new and useful Improvement in Handle Latches for Vacuum Cleaners, of which the following is a specification.

My invention relates to latches for the handles of vacuum cleaners and has for its object to provide a novel and efficient latch whereby the handle is maintained in an upright position when the cleaner is not in operation or in an inclined position relatively to the body of the cleaner to permit the latter to be easily tilted and the nozzle to be raised from the floor when this is desired. Other more specific objects will appear from the description hereinafter and the features of novelty will be pointed out in the appended claims.

Figure 1:
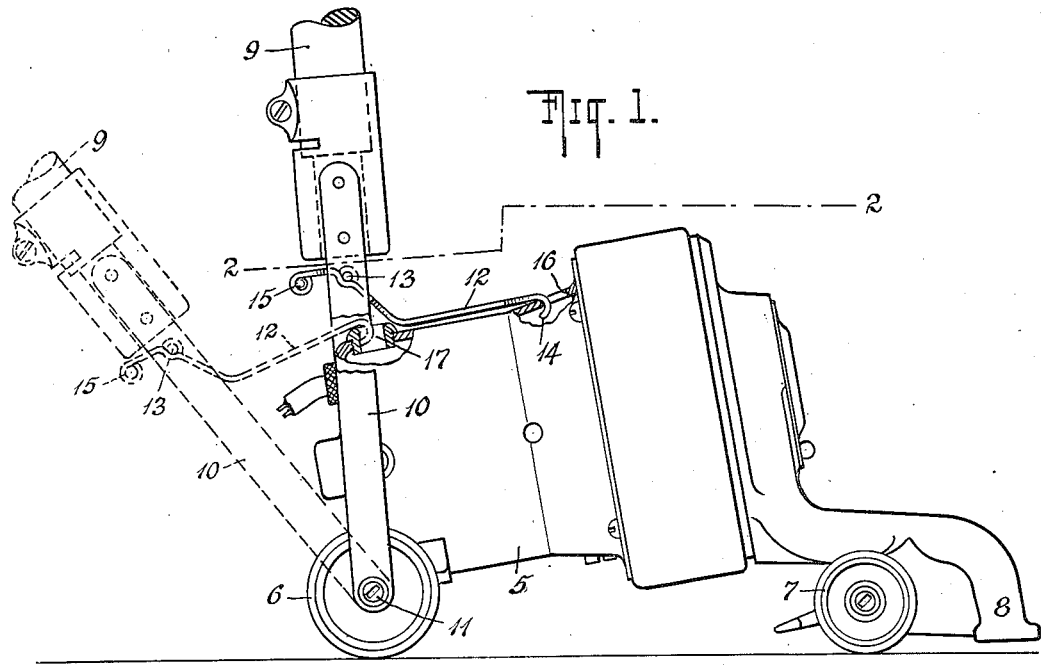
Figure 2:
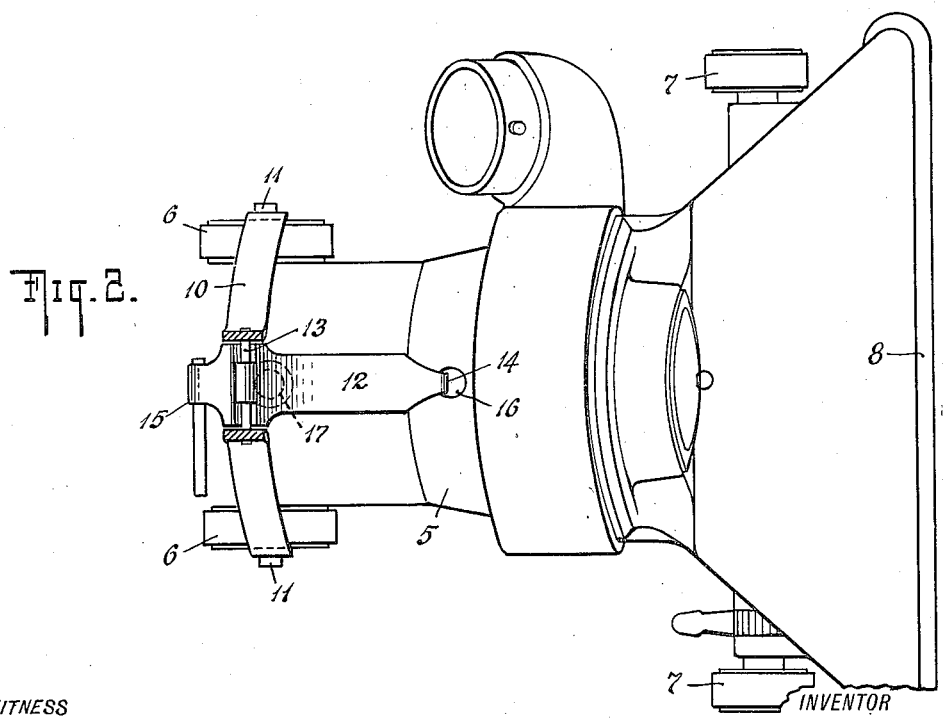

In the accompanying drawings which illustrate an example of the invention, Fig. 1 is a side elevation of a vacuum cleaner with my improved latch applied thereto and Fig. 2 is a horizontal section on the line 2—2 of Fig. 1.

The vacuum cleaner may be of any conventional type comprising a body 5 mounted upon rear wheels 6 and front wheels 7 and having the customary nozzle 8 through which suction is produced by means of a suction fan in the well-known way; the cleaner may further include any other features and elements commonly found in such devices. A handle 9 is secured in a fork 10 which in turn is pivotally connected with the cleaner, for instance, by being mounted upon the axle 11 of the rear wheels 6, said handle serving as a means whereby the cleaner is manipulated.

The latch consists of a member 12 pivotally mounted at 13 in the fork 10 so as to extend forwardly thereof, as shown in Fig. 1, the forward end of said member being fashioned as a hook 14; the member 12 is continued rearwardly of the fork in the form of a trip 15 whereby the latch may be readily shifted to a temporary inoperative position by the foot of the operator. The body 5 of the cleaner is provided with spaced apertures 16 and 17 located on a line in registry with the path of movement of said latch when the handle 9 is pivotally shifted; the aperture 17 preferably comprises an apertured bushing set into the body 5 and projecting above the same, the projecting periphery of said bushing sloping somewhat toward the centre thereof as shown in Fig. 1.

The hook 14 is adapted to enter the aperture 16 when the handle 9 is in the upright position shown by solid lines in Fig. 1 in which position it is maintained by the latch. When it is desired to release the handle from this position it is moved slightly forward and at the same time a downward pressure is exerted upon the trip 15, preferably by the foot of the operator, which swings the member 12 upwardly and lifts the hook 14 out of the aperture 16. The handle 9 is then free to be pivotally swung to an inclined position relatively to the body 5 and thus used for manipulating the cleaner; during ordinary use in moving the cleaner about on its wheels 6 and 7, the handle 9 will occupy inclined positions between the dotted and full line positions shown in Fig. 1 and the latch member 12 will ride back and forth upon the bushing 17 so as to maintain the hook 14 out of contact with the body 5 throughout such movements. It will be understood that the latter are ordinarily not of sufficient extent to cause the hook 14 to drop into either of the apertures 16 or 17. When for any reason it is desired to raise the nozzle 8 away from the floor, for instance to remove surface litter from the rug or carpet or to pass the nozzle over the edges thereof, the handle 9 is swung to the dotted line position in Fig. 1 in which the hook 14 enters the apertured bushing 17. The handle 9 is thereby fixed in the indicated inclined position, so that if a downward force is exerted thereon it will act as a lever and by pulling upon the latch will lift the body 5 upon the rear wheels 6 as a fulcrum, thereby lifting the nozzle 8 away from the floor, rug or carpet over which the cleaner is travelling. To release the handle from this inclined position, it is simply given a forward movement sufficient to cam the hook out of said bushing; that is to say, because of the rounded form of the hook 14, a lifting action will be exerted thereon as it is brought into contact with the periphery of the bushing aperture by the described movement of said handle, so that, in this way the latch will be automatically released from said apertured bushing 17 without requiring any further manipulation of said latch. Similarly the hook 14 will ride up on the sloping surface of said bushing 17 and drop into the aperture thereof when the handle is moved to the dotted line position shown in Fig. 1; if, in manipulating the cleaner, the handle 9 occupies an inclined position lower than that indicated by the dotted lines, the hook 14 will also ride up on said sloping surface of the bushing 17 when the handle is moved back to said dotted line position.

By locating the apertures in the body, the operation of providing co-operating elements therein for the latch is reduced to the simplest form and at the same time a most efficient and positive connection between the latch and the body is effected with a minimum of effort. By providing the bushing 17 for engagement by the hook 14, it is possible to automatically disengage the latch therefrom and at the same time the latter is permitted to assume, without interference, the inclined position which is most efficient for maintaining the handle at the best inclination for tilting the cleaner in the manner set forth; furthermore the bushing provides a bearing surface on which the latch may ride back and forth and whereby the hook 14 is maintained out of contact with the body 5 during manipulation of the cleaner.

The latch maintains the handle in an upright inoperative position and locks it against falling when the cleaner is at rest and furthermore fixes the handle in a position in which it may be used to easily carry the cleaner about from place to place. Furthermore the latch locks the handle in an inclined position most efficient for tilting the cleaner when for any reason this is necessary or desirable as for instance to prevent the possibility of curling up the edges of small rugs and the like.

Various changes in the specific form shown and described may be made within the scope of the claims without departing from the spirit of the invention.

I claim:—

1. The combination of a vacuum cleaner having spaced apertures formed in its body, a handle pivotally connected with said body for manipulating said cleaner, a latch pivotally mounted on said handle, a hook at the one end of said latch adapted to enter said body apertures for maintaining said handle in an upright position and in inclined relation to said body and a tongue forming a continuation of said latch for tripping the same.

2. The combination of a vacuum cleaner having a body provided with spaced apertures, an apertured bushing fitted into one of said apertures, a latch pivotally mounted on said handle, a hook at the one end of said latch adapted to enter said body aperture to maintain said handle in an upright position and to enter said apertured bushing for maintaining said handle in inclined relation to said body and a tongue forming a continuation of said latch for tripping the same.

3. The combination of a vacuum cleaner having a body provided with spaced apertures, an apertured bushing fitted into one of said apertures, and a latch pivotally mounted on said handle, a hook at the one end of said latch adapted to enter said body aperture to maintain said handle in an upright position and to enter said apertured bushing for maintaining said handle in inclined relation to said body, said bushing projecting beyond the body and providing a bearing surface on which said latch travels back and forth and whereby said hook is maintained out of contact with said body during manipulation of the cleaner and means combined with said latch for tripping the same.

In testimony whereof I have hereunto set my hand.

ROBERT COATES. [L. S.]